Patented June 24, 1930

1,766,467

UNITED STATES PATENT OFFICE

WALTER O. SNELLING, OF ALLENTOWN, PENNSYLVANIA

CURRENT-RECTIFYING DEVICE

No Drawing. Original application filed September 20, 1928, Serial No. 307,346. Divided and this application filed July 31, 1929. Serial No. 382,594.

My invention relates to current rectifying devices of the general nature of natural crystal detectors, and more particularly relates to improvements in contact rectifiers, electric valves, contact detectors, and like devices having the property of detecting radiant energy, and of modifying and amplifying the currents set up by ether waves or vibrations.

In my pending application S. N. 307,346, filed September 20, 1928, of which the present application is a division, I have described the preparation of contact rectifying elements produced by the reduction of a salt of lead by means of an element of the sulfur group. I have discovered, however, that by reducing a salt of lead by a binary compound of sulfur such as hydrogen sulfide I can also obtain similar contact rectifying bodies, these contact elements having no macroscopic openings or vesicles, but being characterized by the presence of extremely minute openings or pores. By the methods described in my application already referred to both the composition and the degree of porosity of my products may be varied within very wide limits, and products made in accordance with my invention have been found to have important and very valuable properties in the detection and modification of electric currents set up as the result of the action of radiant energy.

As an example of my present invention, I will describe a process which I may employ in the preparation of current rectifying agents from lead carbonate. Commercial lead carbonate is first compressed, preferably by means of a hydraulic press into coherent tablets or pellets of desired size and shape. Strong pressure should be used, as lead carbonate tends to produce somewhat friable aggregates unless highly compressed. The pellets are next placed in a vessel containing an atmosphere of hydrogen sulfide, and are heated in this atmosphere of hydrogen sulfide for a total period of from three to five minutes. The heating should preferably be gentle at first, the temperature being gradually raised to a dull red heat. A progressive reaction from the surface of the pellet to its interior goes on, but it is not necessary that the center portion of the pellet should be completely reduced. After a heating period of from three to five minutes the resulting product will be found to possess marked current rectifying ability, although both the lead carbonate and the hydrogen sulfide used as raw materials are devoid of current rectifying ability.

Although I have referred specifically to the use of lead carbonate, either as the pure carbonate or the mixture of lead carbonate and lead hydroxide that is known as commercial white lead, as one of my preferred raw materials, my invention is not strictly limited to the use of this material, as I have found that other oxygen-containing salts of lead such as lead sulfite and lead thiosulfite may be similarly employed, the significant element of my invention being the dry reduction of an oxygen-containing salt of lead by means of a binary compound of an element of the sulfur group at a temperature above 400° C., but below 1,200° C. I prefer to employ a temperature of 650° C., corresponding to what is termed a "dull red" heat, and to employ a treating period of from one to seven minutes. When a temperature in excess of 700° C. is used, I prefer to shorten my treating period somewhat, and when a temperature below 500° C. is employed, I find it desirable to materially lengthen the treating period beyond the maximum period of seven minutes which gives the best results when used within the preferred temperature range.

Although I obtain the best results by the use of hydrogen sulfide as the reducing agent which I employ in the dry reduction of my oxygen-containing salt of lead, my invention is not strictly limited to the employment of hydrogen sulfide, and I recognize compounds of selenium and tellurium with hydrogen as equivalents of hydrogen sulfide as a reducing agent.

The products made in accordance with my invention are characterized by possessing a porous structure and are not in any way slag-like or glassy, but instead consist of a macroscopically homogeneous but microscopically heterogeneous structure made up of very minute contacting particles containing metal, oxygen and an element of the sulfur group. The presence of oxygen in my compounds is important, and it is usually of advantage to avoid so complete reduction of the lead salt or equivalent used in my products as to bring the oxygen content of the finished product to too low a figure. Until my discovery of these new products the cause of "sensitive spots" in contact rectifying elements was unknown, but by my present invention I am able to control the sensitiveness of detectors of radiant energy within wide limits by suitable modifications of the atomic arrangement of my products, the presence of dissolved but probably chemically uncombined metallic oxide and dissolved but probably chemically uncombined non-metallic element having the effect of permitting certain ions to possess a wide freedom of movement within the chemical structure of my products. Although I do not have sufficient evidence to prove the correctness of my present theory, it is my belief that the extraordinary activity of my present products is due to the presence of dissolved oxide compounds and of a dissolved element of the sulfur group in my new compounds, these "free" or dissolved components so modifying the intermolecular ionic net work which makes up the chemical compound as to leave certain ions free to enter into weak combination with one or more of the chemical agents present. When an electric current passes through my new products the conductivity is aided by the degree of "looseness" with which these ions are held by the attraction of the dissolved non-metallic element and metal oxide contained in my new compound.

In most of my products a metallic sulfide, selenide or telluride forms the basic product whose ionic structural net work forms the "skeleton" of the molecular structure of the material, while a greater or less quantity of metallic oxide and free non-metallic element provides the source of free or mobile ions. Accordingly in order to obtain maximum sensitiveness in my products, I find it desirable to avoid such long continued reduction of my oxygen containing component, or such extensive oxidation of my non-metallic component, as will cause the complete elimination of these materials. By fusing products made in accordance with my invention their sensitiveness at once decreases to approximately the normal sensitiveness of the ordinary compound, and the distinctive properties which made my products so desirable become partly or wholly lost.

The use of increased pressure, in the operation of making tablets or pellets in accordance with my present invention, leads to increased density of the finished product in all cases. Electrical conductivity is somewhat increased and detecting ability is materially increased by the use of sufficient pressure to give a relatively high density to the finished product. It will be evident that in view of the wide variation in the control of conditions which is possible in the practice of my present invention it is not desirable to state any specific figures for the characteristics of my products, but it is interesting to know that although the specific gravity of lead sulfide as the mineral galena varies from 7.4 to 7.6, the corresponding product made in accordance with my invention by the reaction of an oxygen-containing compound of lead and sulfur has a specific gravity ranging normally from 2.0 to 5.0, according to the composition of the primary base mix and the degree of pressure used in forming tablets of the material. In considering the above figures, it is to be remembered that my compound is not pure lead sulfide, however, but that in addition to lead sulfide it also contains oxygen compounds of lead, and also some free or loosely combined sulfur, and accordingly a strict comparison of its specific gravity with the specific gravity of galena is not fair. In general, however, products made in accordance with my invention are less dense than the corresponding minerals which contain the metal and the element of the sulfur group predominating in my product. In appearance my products are usually smooth, hard blocks, varying in color according to their composition, and even when the surfaces are polished are not glassy or slag-like. My products show no visible openings except on magnification, and are tough and very slightly elastic.

It will be evident that many modifications may be made without departing from the spirit of my invention as disclosed. Although I have illustrated my invention by certain specific embodiments, my invention is not limited to the specific illustrations given, but instead possesses exceptionally wide flexibility in the preparation of a new class of bodies having exceptional properties as conductors in electric circuits, and capable of a wide field of application as detectors, rectifiers and amplifiers of electric currents and radiant energy. Accordingly no limitations should be placed upon my invention, except such as are indicated in the appended claims.

I claim:

1. The process of preparing current rectifying products which comprises reducing a substantially dry salt of lead by a binary compound of sulfur.

2. The process of preparing current rectifying products which comprises reducing a substantially dry salt of lead by a hydrogen compound of an element in the sulfur group.

3. The process of preparing current rectifying elements which comprises reducing a substantially dry carbonate of lead by a binary compound of sulfur.

4. The process of preparing current rectifying products which comprises reducing a substantially dry carbonate of lead by a hydrogen compound of sulfur.

5. The process of preparing current rectifying products which comprises reducing a substantially dry basic lead carbonate by a binary compound of sulfur.

6. The process of preparing current rectifying products which comprises reducing a substantially dry basic lead carbonate by a hydrogen compound of sulfur.

In testimony whereof, I have hereunto subscribed my name this 30th day of July, 1929.

WALTER O. SNELLING.